United States Patent
Szynkarczuk et al.

(10) Patent No.: US 8,398,393 B2
(45) Date of Patent: Mar. 19, 2013

(54) GAS FIRED CATALYTIC HEATER

(75) Inventors: Jarek Szynkarczuk, Edmonton (CA);
Kowlasar Misir, Edmonton (CA);
Harold A. Roozen, Edmonton (CA)

(73) Assignee: CCI Thermal Technologies Inc., Edmonton, Alberta (CA)

(*) Notice: Subject to any disclaimer, the term of this patent is extended or adjusted under 35 U.S.C. 154(b) by 423 days.

(21) Appl. No.: 12/622,746

(22) Filed: Nov. 20, 2009

(65) Prior Publication Data

US 2011/0123940 A1    May 26, 2011

(51) Int. Cl.
*F23Q 9/00* (2006.01)
*B01J 21/00* (2006.01)
*B01J 23/00* (2006.01)
*B01J 23/56* (2006.01)
*B01J 23/02* (2006.01)

(52) U.S. Cl. ........ 431/278; 502/243; 502/258; 502/325; 502/332; 502/344

(58) Field of Classification Search .................. 431/278; 502/325, 344, 243, 258, 332
See application file for complete search history.

(56) References Cited

U.S. PATENT DOCUMENTS

| | | | | |
|---|---|---|---|---|
| 3,240,256 A | * | 3/1966 | Binkley et al. | 431/241 |
| 4,180,384 A | * | 12/1979 | Rice | 44/446 |
| 4,214,867 A | * | 7/1980 | Hunter et al. | 432/29 |
| 5,190,668 A | * | 3/1993 | Chuang | 210/750 |
| 6,015,285 A | * | 1/2000 | McCarty et al. | 431/7 |
| 2010/0303713 A1 | * | 12/2010 | Zhang et al. | 423/658 |

* cited by examiner

*Primary Examiner* — Kenneth Rinehart
*Assistant Examiner* — William Corboy
(74) *Attorney, Agent, or Firm* — Dilworth & Barrese, LLP.

(57) ABSTRACT

A gas fired catalytic heater is provided that foregoes the need for an electrical heating element to provide the activation energy for the hydrocarbon catalyst pad. An alcohol self-igniting catalyst pad is used to provide the activation energy to the hydrocarbon catalyst pad thereby removing dependence of the heater on an outside electrical energy source to initiate start-up of the heater. The catalyst pad includes a flexible wash coat; a noble metal dispersed on the wash coat; an anti-sintering element saturating the wash coat; and a catalyst promoter saturating the wash coat.

13 Claims, 3 Drawing Sheets

GAS FIRED CATALYTIC HEATER

FIELD OF INVENTION

The present invention relates to catalytic heaters and more specifically to gas fired explosion-proof and non-explosion proof catalytic heaters.

BACKGROUND

Non-explosion proof, gas fired, catalytic heaters are typically used for camping or indoors to provide heat to a room as well as for industrial applications for curing paint, powder, glue, etc.

Explosion proof, gas fired, catalytic heaters are typically used for freeze-up protection in areas where hazardous compounds may be present. They are widely used in the oil and gas industry for providing heat to a room or equipment (e.g. pressure regulators) as well as in various industrial processes such as curing solvent based paint. Explosion proof, gas fired, catalytic heaters are designed to work in atmospheres of petroleum products including oil vapours, natural gas, ethane, propane, butane, methanol, ethanol, and other compounds without igniting those vapours or liquids. Catalytic heaters typically comprise of a catalyst pad, a heat source for activating the catalyst pad and a fuel source for combustion on the activated catalyst pad.

Existing explosion proof, gas fired, catalytic heaters typically require the use of electrical elements as the heat source to provide the necessary activation energy for the catalyst pad. Once the catalyst pad is preheated to its activation temperature (minimum temperature requirement), catalytic combustion is initiated upon the introduction of fuels such as natural gas, methane, propane and/or other suitable hydrocarbons. This catalytic reaction then self propagates across the surface of the pad. This process usually takes from 10 to 30 minutes.

One drawback with existing explosion proof, gas fired, catalytic heaters is that the current technology for start-up of the heater is dependent on an outside electric power source such as power grids or automotive batteries to provide the energy flux for the electrical elements used to initiate start-up. The development of a heater that is independent of these power systems is particularly attractive.

Another drawback with the existing explosion proof, gas fired, catalytic heaters is that the start-up time is too long, particularly in low temperatures.

One method to reduce start-up time is the use of a blow torch (open fire) in certain instances to initialize catalytic reaction. However, this method increases the risk of injury or danger and is not allowed in hazardous locations. As such, catalytic gas fired heaters are primarily initiated with imbedded electrical element technology.

A need therefore exists to provide a catalytic gas fired heater which overcomes or mitigates at least one of the drawbacks outlined above or recognized in the industry.

SUMMARY OF INVENTION

A gas fired, explosion or non-explosion proof, catalytic heater is provided that foregoes the need for an electrical heating element to provide the activation energy for the hydrocarbon catalyst pad. An alcohol self-igniting catalyst pad is used in conjunction with a suitable alcohol to provide the necessary activation energy to the hydrocarbon catalyst pad thereby removing dependence of the heater on an outside electrical energy source to initiate start-up of the heater.

In one embodiment there is provided a gas fired catalytic heater comprising:
  a hydrocarbon catalyst pad for igniting a hydrocarbon fuel;
  an alcohol injection device; and
  an alcohol self-igniting catalyst pad in communication with the alcohol injection device, the alcohol self-igniting catalyst pad adapted for exothermic reaction with alcohol to provide activation energy to activate the hydrocarbon catalyst pad and initiate catalytic combustion of the hydrocarbon fuel when injected thereacross.

In another embodiment, there is provided an alcohol injector syringe for injecting alcohol into a catalytic heater, the alcohol injector syringe comprising:
  a body comprising an alcohol compartment and a molecular sieve compartment separated by a membrane;
  an outlet for communication with an alcohol injection device of the catalytic heater, the outlet in fluid communication with the molecular sieve compartment;
  a plunger for forcing alcohol from the alcohol compartment through the molecular sieve compartment and out the outlet.

In another embodiment there is provided an alcohol injector syringe for injecting alcohol into a catalytic heater, the alcohol injector syringe comprising:
  an alcohol injector unit comprising:
    an alcohol compartment;
    an outlet; and
    a plunger in communication with the alcohol compartment for forcing alcohol through the outlet upon depression; and
  a molecular sieve unit comprising:
    an alcohol input for communication with the outlet of the alcohol injector unit;
    a molecular sieve compartment containing molecular sieves; and
an activated alcohol outlet for communication with a alcohol injection device of the catalytic heater, the activated alcohol outlet in fluid communication with the molecular sieve compartment.

In another embodiment there is provided an alcohol self-igniting catalyst pad for insertion in or behind a hydrocarbon catalyst pad of a gas fired catalytic heater, the alcohol self-igniting catalyst pad adapted for exothermic reaction with alcohol to provide activation energy to activate the hydrocarbon catalyst pad and initiate catalytic combustion.

In another embodiment there is provided a method of igniting a gas fired catalytic heater, the method comprising:
  i) initiating an exothermic reaction between an alcohol self-igniting catalyst pad and alcohol for providing activation energy to a hydrocarbon catalyst pad,
  ii) contacting the hydrocarbon catalyst pad with a hydrocarbon fuel once the necessary activation energy has been imparted to the hydrocarbon catalyst pad from the exothermic reaction to initiate combustion of the hydrocarbon fuel across the hydrocarbon catalyst pad.

DETAILED DESCRIPTION

Gas Fired Catalytic Heater

Figure 1:
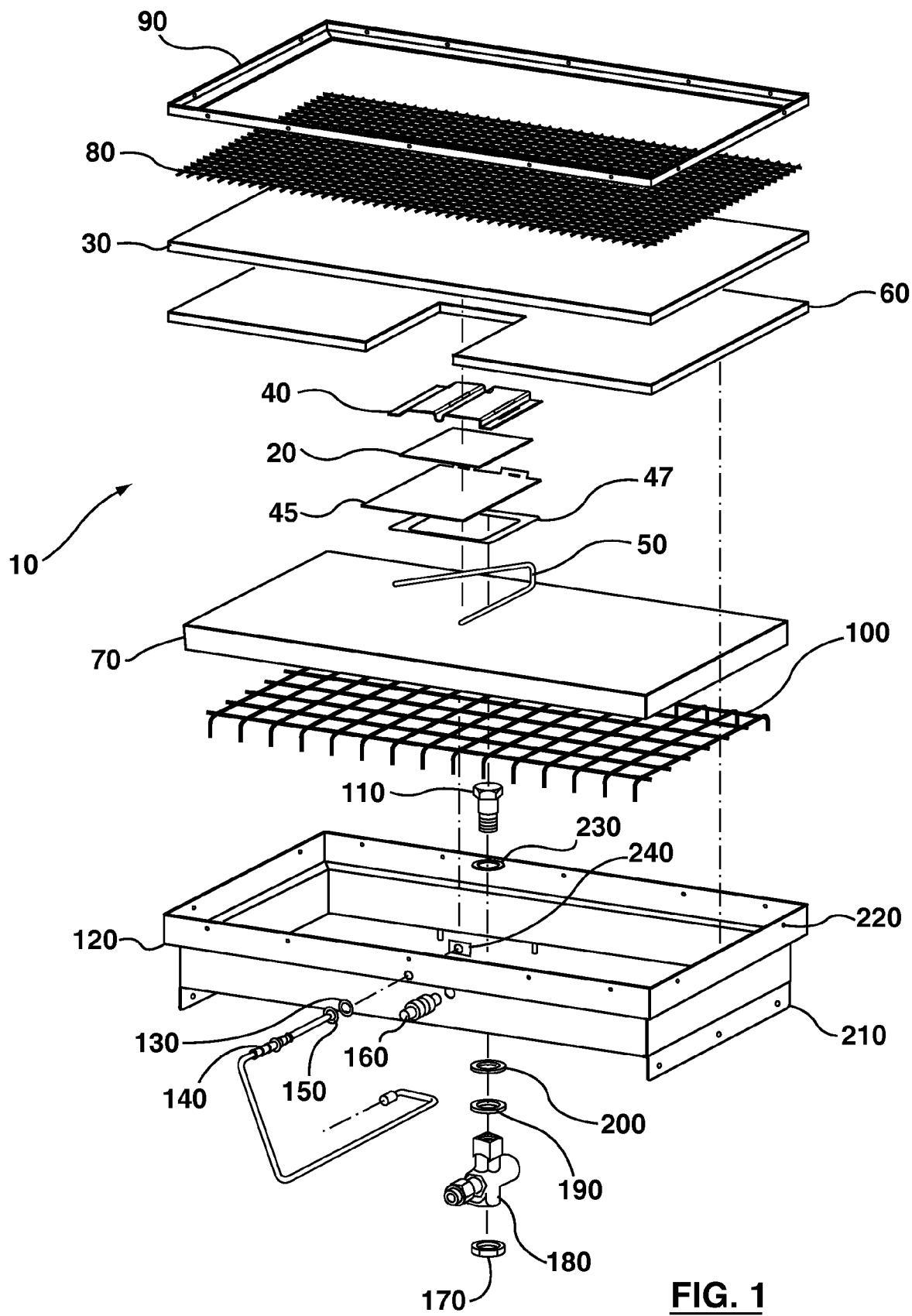
FIG. 1 is an exploded view of one illustrative embodiment of a catalytic heater.

One illustrative embodiment of a gas fired catalytic heater is shown in FIG. 1 wherein the heater 10 is shown in exploded view. The gas fired catalytic heater 10 includes a heater box 120. The gas catalytic heater 10 uses an alcohol self-igniting catalyst pad 20 in place of an electrical heating element to provide sufficient activation energy to a hydrocarbon catalyst pad 30, such as a WX catalyst pad from CCI, such that once activation temperature is achieved, catalytic combustion is initiated upon the introduction of a suitable hydrocarbon fuel such as natural gas, methane or propane. It should be noted that the gas fired catalytic heater 10 may be a non-explosion (regular) or an explosion proof, gas fired, catalytic heater thereby providing increased safety and decrease risk of fire, especially in a hazardous location. Non-explosion proof heaters i.e. used for camping; curing paint or domestic heaters can use the same start-up procedure, an example of which is outlined below. Other manufacturers of gas fired, explosion proof heaters can adopt this method for their own products. This eliminates the need for matches, piezoelectric or electrical elements.

The alcohol self-igniting catalyst pad 20 comprises a catalyst component that reacts with alcohol in an exothermic reaction which generates sufficient heat to provide activation energy to the hydrocarbon catalyst pad 30. Typically, the alcohol catalyst pad 20 reacts with an alcohol such as methanol, ethanol, propanol, or isopropanol. In one embodiment, the alcohol is methanol and the alcohol self-igniting catalyst pad 20 reacts on contact with methanol in an exothermic reaction to provide the necessary activation energy to the hydrocarbon catalyst pad 30.

In one illustrative embodiment, the catalyst component of the alcohol self-igniting catalyst pad 20 comprises a noble metal dispersed on a cloth-like flexible wash coat saturated with anti-sintering elements and a catalyst promoter.

The noble metal may be an oxidation catalyst composed of metals selected from Rh, Ru, Pd, Pt, Ir or Au or mixtures thereof. Typical metal content may be from 1%-30% by weight.

The wash coat composition may comprise of at least one compound selected from $Al_2O_3$, $SiO_2$, $TiO_2$ or mixtures thereof. Typical content may be from 70%-99% by weight.

An anti-sintering element is optional and may be composed of metals selected from Ni, Sb, Zr, La or Y or mixtures thereof. Typical metal content may be from 0%-5% by weight.

A promoter element is also optional and may be composed of metals selected from Al, Si, Ce, or Zr or mixtures thereof. Typical metal content may be from 0%-5% by weight.

By using the alcohol self-igniting catalyst pad 20 to provide the activation energy to the hydrocarbon catalyst pad 30, the need for an electric element to provide the necessary activation energy is eliminated. The alcohol self-igniting catalyst pad 20 requires minimal activation energy and as a result, spontaneously combusts when alcohol, such as methanol, comes into contact with it. The catalytic combustion occurs at room temperature and can occur from −40° C. to 30° C. thereby providing for usability in most outdoor and indoor applications. The initiation of start-up of the catalytic heater 10 is controlled by the alcohol injection and the alcohol sensitive catalyst that spontaneously combusts the alcohol in an exothermic reaction thereby initiating catalytic combustion of hydrocarbon fuel, such as natural gas, once in contact with the hydrocarbon catalyst pad 30. Once the heater 10 is fired and the alcohol is exhausted, there is no need for the alcohol self-igniting catalyst pad 20 to be operational until the heater has to be re-started.

The alcohol self-igniting catalyst pad 20 is typically housed between a top screen 40 and a bottom screen 45, optionally in a 20 gauge stainless steel screen housing. The housing is of similar dimension to the pad 20 and may be appended to a side of the heater box 120 using any suitable means such as with rivets or a swage-lock system. The housing is perforated to allow for the percolation of alcohol and air to the alcohol self-igniting catalyst pad 20. The housing may be sandwiched between an insulation pad 70 and the hydrocarbon catalyst pad 30. A further insulation pad 60, optionally a superwool insulation pad, with a void cut out substantially in the shape of the alcohol catalyst pad housing may be used and provides a plane for the alcohol catalyst pad housing to sit in.

Alcohol may be delivered to the alcohol self igniting catalyst pad 20 through the use of an alcohol injector device 50. The device 50 may be made of stainless steel or other suitable metallic material. One non-limiting embodiment of a device 50 provides for a wand having an outside diameter of 0.125 inches and an interior diameter of 0.078 inches. However, it will be appreciated that other suitable sizes may be used for the wand. The device 50 includes a delivery section which may comprise a series of holes (not shown), optionally evenly spaced, situated such that alcohol is sprayed onto the surface of the alcohol self igniting catalyst pad 20 upon alcohol injection into the device 50. The delivery section of the device 50 may be affixed diagonally across the surface of the alcohol self igniting catalyst pad 20, however it will be appreciated that this is not a required conformation for utility and other formats, such as for example, the device 50 situated on top of the alcohol catalyst top screen 40 may be used.

The device 50 may be held in place by the use of a bulkhead connector 160. In such a setup, the device 50 may be swage-locked into the bulkhead connector 160 and bolted onto the heater box 120. The device 50 serves as the port of entry for alcohol that is injected to initiate catalytic reaction. This entrance port is typically closed with a screw-on cap or the like. The entire system should be sealed as known in the art.

The remaining heater components may be provided as in a typical heater or explosion proof heater to provide for suitable insulation, valving, piping, safety features, etc. These components may include for example, a bezel 90, a screen 80, a spud nozzle 110, gaskets 200, washers 190 and 150, connector nut 170, brackets 210, rivets 160 and 220, connectors 240, lockwashers 230, a thermocouple 140 and thermocouple gasket 130, a safety shut off valve 180 and baffle plate 100. It will be appreciated that any suitable gas fired catalytic heater construction and components may be used as known in the art to complete the heater as necessary or desired for a given application and/or use. Additional components known to those in the art may be used and the exploded illustrative representation of the heater 10 of FIG. 1 is merely illustrative of one construction of a heater and is not limiting other than the use of the alcohol self-igniting catalyst pad 20.

In contrast to prior systems which take up to 30 minutes to complete ignition, typical ignition times of a heater of the present invention range from 1 to 5 minutes depending on the ambient temperature, the amount of alcohol injected, the hydrocarbon fuel activation energy required, sensitivity of the thermocouple 140 and the safety shut off valve (SSOV) 180. If the thermocouple 140 and SSOV 180 are not used, the start-up time is reduced and would be substantially instantaneous. While when they are used as required for hazardous locations, there is a small time delay needed for the thermocouple 140 to warm up in order to generate enough current that the electromagnet inside the SSOV 180 remains open and allows the fuel to enter the heater 10. At lower ambient temperatures the catalytic alcohol combustion reaction may take longer to provide sufficient activation energy to initiate catalytic combustion of the fuel when in contact with the hydrocarbon catalyst pad 30.

One issue involved with the use of the alcohol catalyst pad 20 is that over time the alcohol active pad 20 may become dormant. This arises as a result of the adsorption of moisture onto the active catalytic sites of the alcohol self-igniting catalyst pad 20. The adsorbed water molecules inhibit the adsorption of the alcohol species onto the active catalytic sites thereby preventing the exothermic catalytic combustion of the alcohol from propagating. As such, enough energy is not generated to initiate the spontaneous combustion reaction and the heater 10 does not fire. The alcohol species are not able to displace the adsorbed water molecules, resulting in the pad 20 becoming dormant. One embodiment of the heater 10 at least partially overcomes this issue thereby extending the operational life of the alcohol self-igniting catalyst pad 20 by incorporating a module 47 containing desiccants within the alcohol self-igniting catalyst pad 20 to serve as a sacrificial agent. The desiccants attract moisture thereby reducing the quantity adsorbed on the active catalytic sites. When the heater 10 is in use, i.e. fired, the desiccant module 47 is regenerated rendering it active for re-start of the heater 10.

A further or alternative solution to the issue of moisture adsorption is to inject activated alcohol onto the alcohol self-igniting catalyst pad 20. For the purposes of this disclosure, activated alcohol can be considered to be alcohol having an elevated temperature suitable for displacing the water molecules from the active catalytic sites. Typically, the activated alcohol has an elevated temperature of about 20° C.-60° C. to displace the water molecules from the active catalytic sites. An alcohol injector syringe for injecting activated alcohol into the heater 10 will be outlined in detail further below.

Alcohol, and especially methanol, is a suitable chemical for use in catalytic heaters and explosion proof catalytic heaters as the Canadian Standards Associations in Canada and Factory Mutual in the United States have deemed methanol to be permitted in Class 1, Division 1, Group D locations. This is important as heaters of this type are generally used in these locations as flammable petroleum products such as natural gas, propane as well as alcohols, including methanol, and organic solvents may be present in these locations. As a result the use of alcohol is a viable and useful solution for use with a alcohol sensitive catalyst for producing sufficient energy from alcohol combustion capable of activating combustion in the hydrocarbon catalytic pad and/or an explosion proof catalytic heater.

To ensure that the heater 10 may be considered to be an explosion proof heater certain fabrication steps should be taken. The alcohol self-igniting catalyst pad 20 may not be explosion proof while the hydrocarbon catalyst pad 30 is. To provide an explosion proof heater, the alcohol self-igniting catalyst pad 20 is placed inside the gas fired heater 10 so that excessive heat coming from the alcohol combustion is contained inside the explosion proof unit.

Thus, accidental ignition of petroleum product before injection into the heater is reduced or even eliminated. By placing the alcohol self-igniting catalyst pad 20 on the opposite side of the hydrocarbon catalyst pad 30, only the hydrocarbon catalyst pad 30 is exposed to the environment and the hydrocarbon fuel. Excess alcohol, if any, is adsorbed by the hydrocarbon catalyst pad 30, considered to be explosion proof, that is not sensitive to the alcohol at ambient temperature and would consume any excess alcohol at elevated temperature, maintaining its explosion-proof characteristic. After the hydrocarbon catalyst pad 30 is operational, it consumes all combustion oxygen, which is diffusing from the front of the hydrocarbon catalyst pad 30, and therefore, the imbedded alcohol pad 20 does not produce any additional heat. The lack of oxygen deactivates the alcohol catalyst pad 20, as it may be active at elevated temperatures in the presence of hydrocarbon based fuel and oxygen from the air. This feature is important in hazardous locations where no need for any additional heat is required but for that generated from the hydrocarbon catalyst pad 30.

A further benefit of the heater 10 is that the ignition mechanism including the alcohol self-igniting catalyst pad 20 and the hydrocarbon catalyst pad 30 may be used for activation of gas fired heaters, furnaces, barbeques, including camping, furnished with a regular or/and explosion proof units. This avoids the need for spark initiated systems or electric element dependent systems.

It will be appreciated that the Canadian Electrical Code Definition of "explosion-proof" means enclosed in a case which is capable of withstanding, without damage, an explosion, which may occur within it, of a specified gas or vapour and capable of preventing the ignition of a specified gas or vapours surrounding the enclosure from sparks, flashes, or explosion of the specified gas or vapour within the enclosure.

In a further embodiment, it will also be appreciated that for the purposes of this disclosure, the term "explosion-proof" includes explosion proof heater certified in Class I Division 1 and Group D, will not ignite gases or vapours that are in group D when they are present 24 hours a day. Canadian Standard Associations and Factory Mutual list those substances in Groups A-G. Heater's case (metal) temperature is below the auto-ignition temperature of gases/vapours from group D, while the explosion proof catalyst pad (burner) consumes those gases/vapours without igniting them, e.g. if you take a glass full of gasoline and pour on the explosion proof burner the gasoline is not ignited. Evaporation would likely occur as well as associated odours.

Alcohol Injection Syringe

Figure 2:
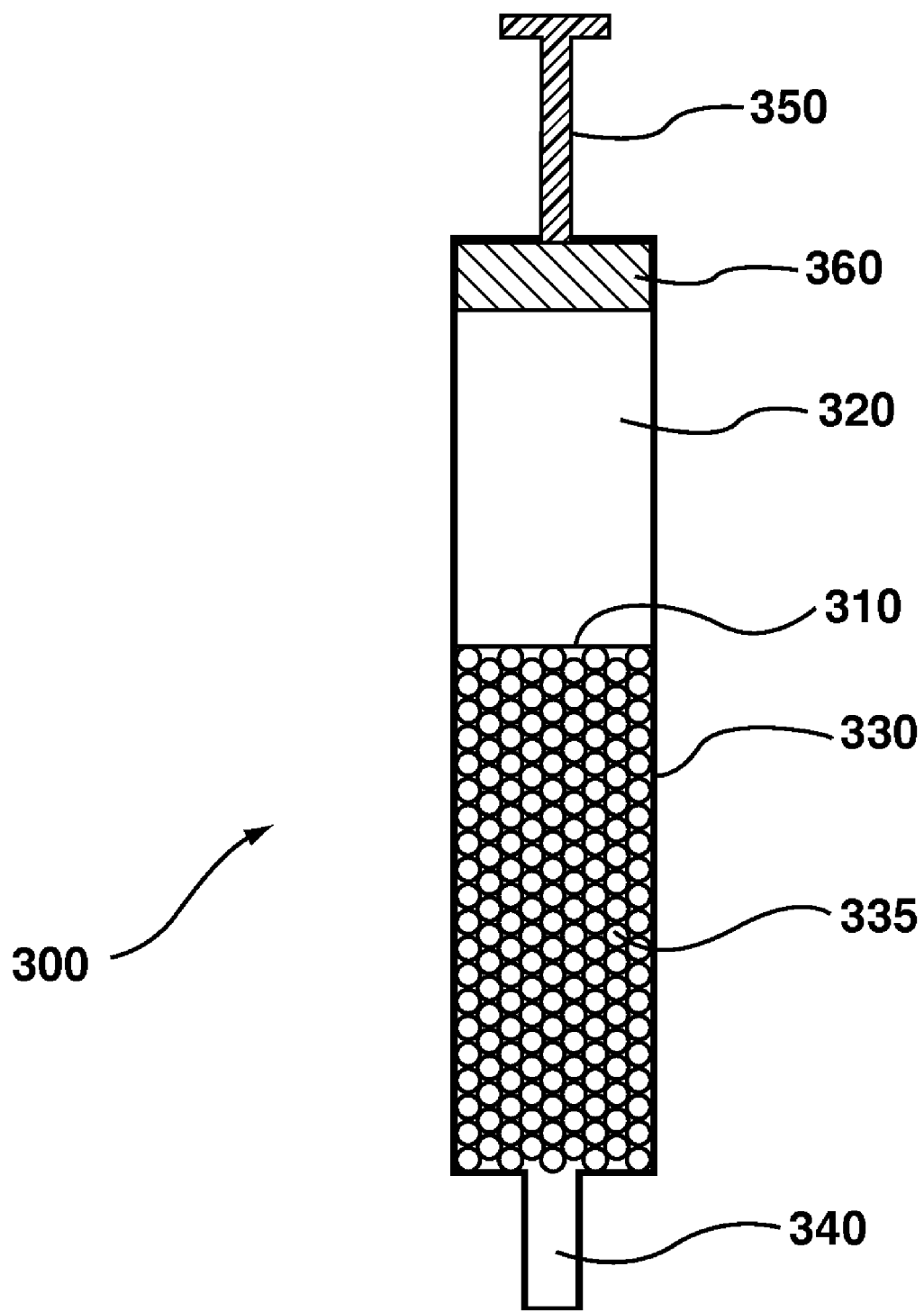
FIG. 2 is a cross-sectional view of one illustrative embodiment of an alcohol injector syringe.
Figure 3:
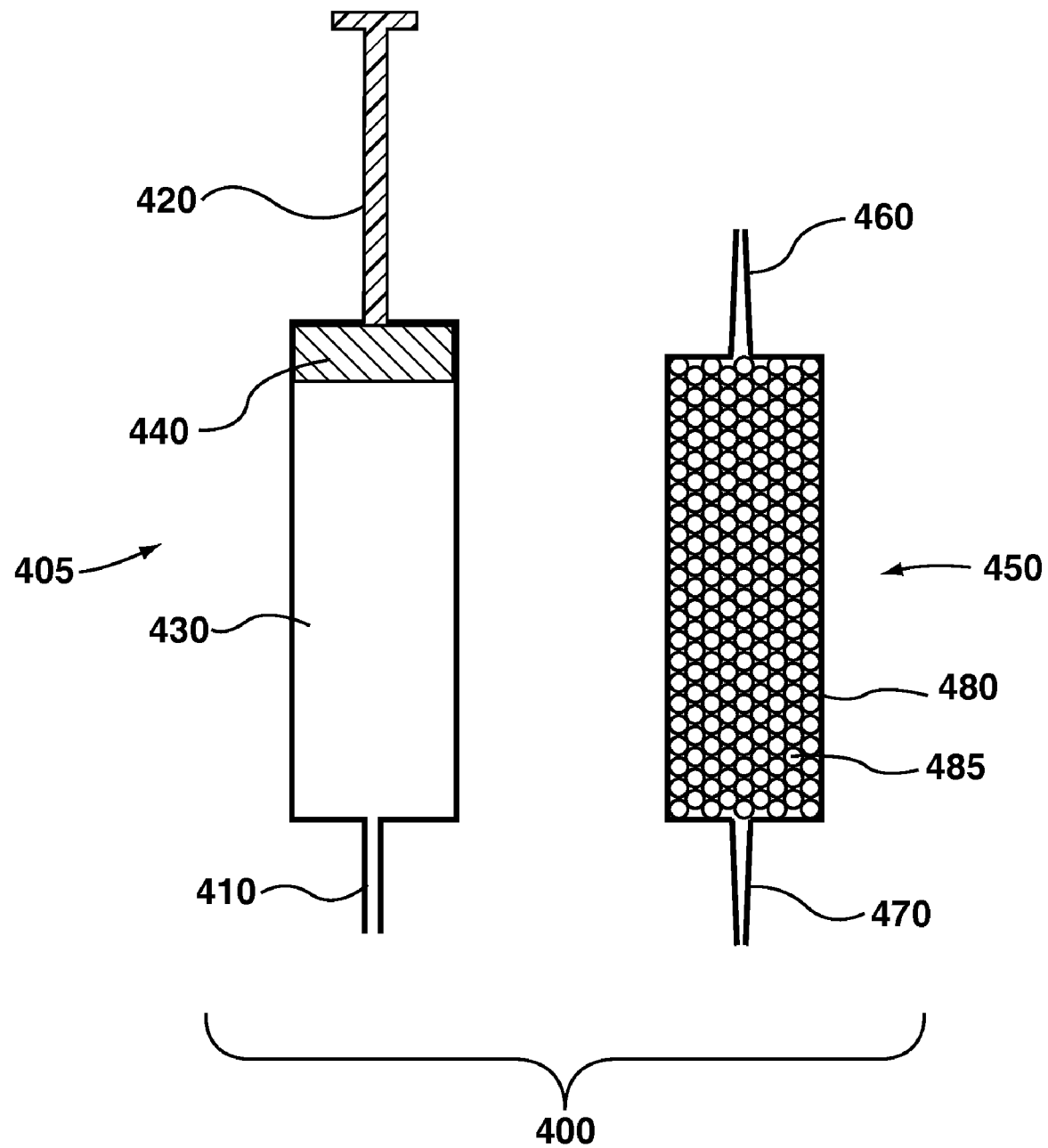
FIG. 3 is a cross-sectional view of another illustrative embodiment of an alcohol injector syringe.

FIGS. 2 and 3 illustrate separate embodiments of an alcohol injection syringe useful for injecting alcohol or activated alcohol into an alcohol receiver such as an alcohol injection wand as described above with reference to FIG. 1.

An alcohol injection syringe is shown generally at 300 in FIG. 2. The syringe 300, also referred to as a cartridge, includes an upper alcohol compartment 320 for containing alcohol, such as methanol, and a lower molecular sieve compartment 330 for containing molecular sieves 335. The two compartments 320 and 330 are separated by a non-permeable membrane 310, for example a thin polyethylene membrane. A plunger 350, when depressed, forces alcohol to break the membrane 310 and flow from the alcohol compartment 320 across the molecular sieves 335 in the molecular sieve compartment 330 and become activated. Activated alcohol may then be released and injected into a suitable inlet on the heater, such as the device 50 described above, through the outlet 340. The molecular sieves 335 adsorb a certain amount of alcohol and release heat through adsorption. The excess alcohol adsorbs this heat and in turn is heated up and activated. Upon injection into the heater 10, the activated alcohol is able to initiate catalytic reaction faster and at lower temperatures.

In one embodiment, the outlet 340 is sized to fit with and inject alcohol into the device 50 of the heater described above.

The injection syringe 300 may be sealed at the top around the plunger 350 with a press seal 360.

The alcohol injection syringe 300 is convenient for use in camping or similar applications as it is easy to store, flameless and because it is sealed, minimizes environmental impact due to spillage. The syringe 300 may be refilled with alcohol after use and the molecular sieves may be either recharged for use again or simply replaced. Alternatively, a user may simply purchase multiple syringes for repeated start-up of the heater. Risk of fire or explosion is reduced or even eliminated as the syringe 300 may be adapted to fit tightly or even sealingly with a alcohol input in the heater thereby further minimizing spillage and exposure of the alcohol to an exterior heat source or spark.

FIG. 3 shows an illustrative embodiment of a variant of an alcohol injector syringe shown generally at 400. The syringe 400 includes two units, namely an alcohol injector unit 405 and a molecular sieve unit 450. The alcohol injector unit 405 includes an alcohol compartment 430 and a plunger 420 for forcing the alcohol through an output 410. The alcohol compartment 430 may be sealed as described above with a press seal 440. The molecular sieve unit 450 includes an alcohol input 460 for connection with the output 410, a molecular sieve compartment 480 containing molecular sieves 485 and an output 470 suitable for connection with an alcohol input of a heater such as that described above with reference to FIG. 1. To activate the alcohol, the alcohol injector unit 405 is connected to the molecular sieve unit 450 via the output 410 and the input 460 and the plunger 420 is depressed. Alcohol is injected into the molecular sieve compartment 480 and flows over the molecular sieves 485 where, as outlined above, the molecular sieves 485 adsorb a certain amount of alcohol and release heat through adsorption. The excess alcohol adsorbs this heat and in turn is heated up and activated. Upon injection into the heater 10, the activated alcohol is able to initiate catalytic reaction faster and at lower temperatures.

By having a separate unit for alcohol and for molecular sieves, a user need only replace the molecular sieve unit 450 and refill the alcohol in the alcohol unit 405 in order to have a syringe useful for starting the heater. Unit 450 may contain a screw cap for re-charging molecular sieves 485. It should be noted however, that if the alcohol catalyst pad 20 is active or non-dormant, the alcohol injector unit 405 may be used to initiate alcohol combustion without the need for the molecular sieve unit 450. However, if the alcohol active pad 20 becomes dormant this method may not be able to initiate alcohol combustion, while the presence of molecular sieve unit 450, allows for prompt initiation process.

The cartridges 300 and 450 should be stored in a sealed container such as a plastic bag (e.g. zip lock) and/or with caps on their inlet 460 and outlet 340, 470 ports in order not to adsorb moisture from the air.

Molecular sieve 13X was chosen for this application as it produced the highest amount of heat per unit of mass, however, other molecular sieves such as 4A, 5A, other chemicals including activated alumina and other types of desiccants may be used.

Start-Up Operation of Alcohol Activated Heater

The following is a non-limiting example of a suitable start-up procedure for firing a heater such as that described with reference to FIG. 1.

Remove the threaded cap from the bulkhead adapter 160 and attach the alcohol input, for example the input 340 or 410/470 of the alcohol injector syringe as described with reference to FIG. 2 or 3, respectively. Gently inject about 30-40 ml of methanol into the methanol injection device 50. Remove the methanol injector from the bulkhead adapter 160 and attach the threaded cap to avoid gas leakage when the heater is operational. The methanol catalytic combustion reaction should be substantially instantaneous and depending on the environment ambient temperature, the user should be able to feel heat being generated from the methanol combustion within seconds of injection. After injecting the methanol, the user may confirm the initiation of the catalytic reaction by placing their hand over the methanol catalyst pad 20 and observing the generation of heat. The catalytic combustion of methanol is highly exothermic and provides the activation energy required for the activation of the hydrocarbon catalyst pad 30. After approximately 3-5 minutes has elapsed, depress the safety shut-off valve 180. The valve 180 should open allowing hydrocarbon fuel such as natural gas to flow to the heater 10. At this stage, the initial burst of heat energy should be sufficient to initiate the catalytic combustion of the hydrocarbon fuel. The catalytic reaction self propagates across the entire hydrocarbon catalyst pad 30.

Alternatively an alcohol injection unit 405 can be used by itself. However, alcohol catalytic combustion reaction may not be initiated particularly at low ambient temperature. At temperatures above 0° C. that could be a more convenient, less cumbersome method for startup.

The present invention has been described with regard to a plurality of illustrative embodiments. However, it will be apparent to persons skilled in the art that a number of variations and modifications can be made without departing from the scope of the invention as defined in the claims.

We claim:

1. A gas fired catalytic heater comprising:
    a hydrocarbon catalyst pad for igniting a hydrocarbon fuel;
    an alcohol injection device;
    an alcohol self-igniting catalyst pad in communication with the alcohol injection device, the alcohol self-igniting catalyst pad adapted for exothermic reaction with alcohol to provide activation energy to activate the hydrocarbon catalyst pad and initiate catalytic combustion of the hydrocarbon fuel when injected thereacross; and
    a regenerating moisture trap in proximity to the alcohol self-igniting catalyst pad for adsorbing moisture thereby reducing moisture adsorbed by the alcohol self-igniting catalyst pad;
    wherein the alcohol injection device comprises holes situated adjacent the alcohol self-igniting catalyst pad for spraying alcohol onto the surface of the alcohol self-igniting catalyst pad when alcohol is injected into the alcohol injection device.

2. The catalytic heater of claim 1 wherein the alcohol self-igniting catalyst pad comprises:
    a flexible wash coat; and
    a noble metal catalyst highly dispersed on the wash coat.

3. The catalytic heater of claim 2, wherein the flexible wash coat is a cloth-like flexible wash coat comprising at least one compound selected from Al2O3, SiO2, TiO2 or mixtures thereof.

4. The catalytic heater of claim 2, wherein the noble metal is an oxidation catalyst metal selected from Rh, Ru, Pd, Pt, Ir, Au or mixtures thereof.

5. The catalytic heater of claim 2, wherein the flexible wash coat is present in an amount of from 70-99% by weight and the noble metal is present in an amount of from 1 to 30% by weight.

6. The catalytic heater of claim 1, wherein the alcohol self-igniting catalyst pad further comprises an anti-sintering element composed of a metal selected from Ni, Sb, Zr, La, Y or mixtures thereof and is present in an amount of 5% or less by weight.

7. The catalytic heater of claim 1, wherein the alcohol self-igniting catalyst pad further comprises a catalyst promoter, wherein the catalyst promoter is a comprised of one or more metals selected from Al, Si, Zr, Ce or their respective oxides and is present in an amount of 5% or less by weight.

8. The catalytic heater of claim 1, wherein the hydrocarbon fuel is natural gas, ethane, propane, butane or gas-air mixtures.

9. The catalytic heater of claim 1, wherein the alcohol self-igniting catalyst pad is for exothermic reaction with methanol, ethanol, propanol or isopropanol.

10. The catalytic heater of claim 1, further comprising an insulation layer and wherein the alcohol self-igniting catalyst pad is sandwiched between the insulation layer and the hydrocarbon catalyst pad.

11. The catalytic heater of claim 1, wherein the alcohol self-igniting catalyst pad is approximately 4×4 inches in size and is housed in a metallic housing of similar dimensions.

12. The catalytic heater of claim 1, wherein the catalytic heater is an explosion proof catalytic heater.

13. The catalytic heater of claim 1, wherein the regenerating moisture trap comprises a desiccant.

* * * * *